United States Patent
Levin et al.

(10) Patent No.: US 9,111,381 B2
(45) Date of Patent: Aug. 18, 2015

(54) SHIFT-VARYING LINE PROJECTION USING GRAPHICS HARDWARE

(75) Inventors: Craig S. Levin, Palo Alto, CA (US); Guillem Pratx, Mountain View, CA (US); Jingyu Cui, Stanford, CA (US); Sven P. Prevrhal, San Francisco, CA (US)

(73) Assignee: Koninklijke Philips N.V., Eindhoven (NL)

( * ) Notice: Subject to any disclaimer, the term of this patent is extended or adjusted under 35 U.S.C. 154(b) by 565 days.

(21) Appl. No.: 12/931,263

(22) Filed: Jan. 27, 2011

(65) Prior Publication Data

US 2011/0182491 A1 Jul. 28, 2011

Related U.S. Application Data (60) Provisional application No. 61/336,969, filed on Jan. 27, 2010.

(51) Int. Cl.
*G06T 15/00* (2011.01)
*G06T 11/00* (2006.01)

(52) U.S. Cl.
CPC ............ *G06T 11/006* (2013.01); *G06T 15/005* (2013.01); *G06T 2211/421* (2013.01); *G06T 2211/428* (2013.01)

(58) Field of Classification Search
CPC  A61B 6/032; G06T 11/006; G06T 2211/424; G06T 11/005
USPC ...................................... 382/131; 250/363.03
See application file for complete search history.

(56) References Cited

U.S. PATENT DOCUMENTS

| | | | | |
|---|---|---|---|---|
| 7,120,283 B2 * | 10/2006 | Thieret et al. | .................. | 382/131 |
| 7,756,307 B2 * | 7/2010 | Thielemans | .................. | 382/131 |
| 7,856,129 B2 * | 12/2010 | Panin et al. | ..................... | 382/128 |
| 7,897,926 B2 * | 3/2011 | Vandenberghe | ......... | 250/363.04 |
| 7,916,144 B2 * | 3/2011 | Schiwietz et al. | ............. | 345/501 |
| 7,986,823 B2 * | 7/2011 | Wang et al. | ..................... | 382/131 |
| 2004/0081340 A1 * | 4/2004 | Hashimoto | ................... | 382/128 |
| 2007/0201611 A1 | 8/2007 | Pratx et al. | | |

(Continued)

FOREIGN PATENT DOCUMENTS

WO    WO 2007100955 A2 *   9/2007

OTHER PUBLICATIONS

Nickolls et al., Scalable Parallel Programming with CUDA, Mar. 2008, ACM: Queue—GPU Computing, vol. 6 Issue 2, pp. 40-53.*

(Continued)

*Primary Examiner* — Matthew Bella
*Assistant Examiner* — Dennis Rosario (57) ABSTRACT

Line segments are classified according to orientation to improve list mode reconstruction of tomography data using graphics processing units (GPUs). The new approach addresses challenges which include compute thread divergence and random memory access by exploiting GPU capabilities such as shared memory and atomic operations. The benefits of the GPU implementation are compared with a reference CPU-based code. When applied to positron emission tomography (PET) image reconstruction, the GPU implementation is 43× faster, and images are virtually identical. In particular, the deviation between the GPU and the CPU implementation is less than 0.08% (RMS) after five iterations of the reconstruction algorithm, which is of negligible consequence in typical clinical applications.

20 Claims, 5 Drawing Sheets

(56) References Cited

U.S. PATENT DOCUMENTS

2010/0202664 A1* 8/2010 Busch et al. .......... 382/107
2012/0126125 A1* 5/2012 Akazawa et al. ........ 250/363.04

OTHER PUBLICATIONS

Pratx et al., Fully 3-D List-Mode OSEM Accelerated by Graphics Processing Units [on-line], Oct. 29-Nov. 1, 2006 [retrieved on Feb. 20, 2013], IEEE Nuclear Science Symposium Conference Record, 2006, vol. 4, pp. 2196-2202. Retrieved from the Internet: http://ieeexplore.ieee.org/xpls/abs_all.jsp?arnumber=4179464.*

Stsepankou et al., Real-Time 3D Cone Beam Reconstruction [on-line], Oct. 16-22, 2004 [retrieved Jan. 30, 2015], 2004 IEEE Nuclear Science Symposium Conference Record, vol. 6, pp. 3648-3652. Retrieved from the Internet: http://ieeexplore.ieee.org/xpls/abs_all.jsp?arnumber=1466673.*

Barker et al., "GPU acceleration of MOLAR for HRRT list-mode OSEM reconstructions" 2007, pp. 3004-3008, 2007 IEEE Nuclear Science Symposium Conference Record.

Kinouchi et al., "GPU implementation of list-mode DRAMA for real-time OpenPET image reconstruction", 2010 IEEE Nuclear Science Symposium and Medical Imaging Conference, Paper M9-281.

Xu et al., "Accelerating popular tomographic reconstruction algorithms on commodity PC graphics hardware", 2005, pp. 654-663, IEEE Trans. Nuclear Science 52(3).

Pratx et al., "Fast, accurate and shift-varying line projections for iterative reconstruction using the GPU" 2009, pp. 435-445, IEEE Trans. Medical Imaging 28(3).

Pratx et al., "Fast list-mode reconstruction for time-of-flight PET using graphics hardware" published online Nov. 14, 2010, IEEE Trans. Nuclear Science.

* cited by examiner

SHIFT-VARYING LINE PROJECTION USING GRAPHICS HARDWARE

CROSS REFERENCE TO RELATED APPLICATIONS

This application claims the benefit of U.S. provisional patent application 61/336,969, filed on Jan. 27, 2010, entitled "Shift-Varying Line Projection using Graphics Hardware", and hereby incorporated by reference in its entirety.

FIELD OF THE INVENTION

This invention relates to reconstruction of images from tomographic data.

BACKGROUND

Several medical imaging modalities are based on the reconstruction of tomographic images from projective line-integral measurements. For these imaging modalities, typical iterative implementations spend most of the computation performing two line projection operations. The forward projection accumulates image data along projective lines. The back-projection distributes projection values back into the image data uniformly along the same lines. Both operations can include a weighting function called a "projection kernel", which defines how much any given voxel contributes to any given line. For instance, a simple projection kernel is 1 if the voxel is traversed by the line, zero otherwise.

As a result of the increasing complexity of medical scanner technology, the demand for fast computation in image reconstruction has exploded. Fortunately, line projection operations are independent across lines and voxels and are computable in parallel. Early after the introduction of the first graphics acceleration cards, texture mapping hardware was proposed as a powerful tool for accelerating the projection operations for sinogram datasets.

Figure 2:
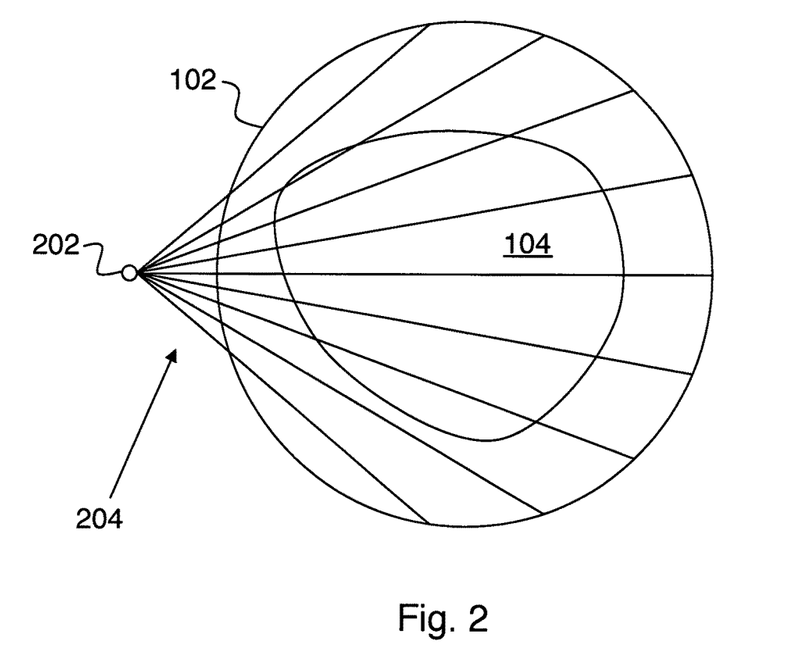
FIG. 2 shows an example geometry for tomography based on sinogram data.

In a sinogram, projective lines are organized according to their distance from the isocenter and their angle. FIG. 2 shows an example of sinogram data. Here, a set of lines 204 emanates from a source 202 and passes through an object 104. Integrated responses along each of the lines are measured by numerous detectors (not shown) at the periphery of the system chamber 102. The linear mapping between the coordinates of a point in the reconstructed image and its projection in each sinogram view can be exploited using linear interpolation hardware built into the texture mapping units, which is the basis for almost every GPU implementation. The article by Xu et al., "Accelerating popular tomographic reconstruction algorithms on commodity PC graphics hardware" (IEEE Trans. Nuc. Sci. 52(3) (2005) p654) is an example of such a GPU approach.

While many tomographic imaging modalities such as X-ray computed tomography (CT) acquire projection data of inherent sinogram nature, others—in particular, positron emission tomography (PET)—are based on spatially-random measurements.

In clinical practice, PET scanners are used mainly in the management of cancer. The purpose of a PET scan is to estimate the biodistribution of a molecule of interest—for instance, a molecule retained by cancerous cells. A radioactive version of the molecule is administered to the patient and distributes throughout the body according to various biological processes. Radioactive decay followed by positron-electron annihilation results in the simultaneous emission of two anticollinear high-energy photons. These photons are registered by small detector elements arranged around the measurement field. Detection of two photons in near temporal coincidence indicates that a decay event likely occurred on the line (called line of response, or LOR) that joins the two detector elements involved. The stream of coincidence events is sent to a data acquisition computer for image reconstruction.

Some PET systems have so called time-of-flight (TOF) capabilities. In these systems, the difference in arrival time of the two high-energy photons is measured with high accuracy. This measurement is used to estimate the rough position of the radioactive decay along the LOR. Included in the image reconstruction, the TOF information can improve image quality and quantitative accuracy, thereby improving lesion detectability.

Figure 1:
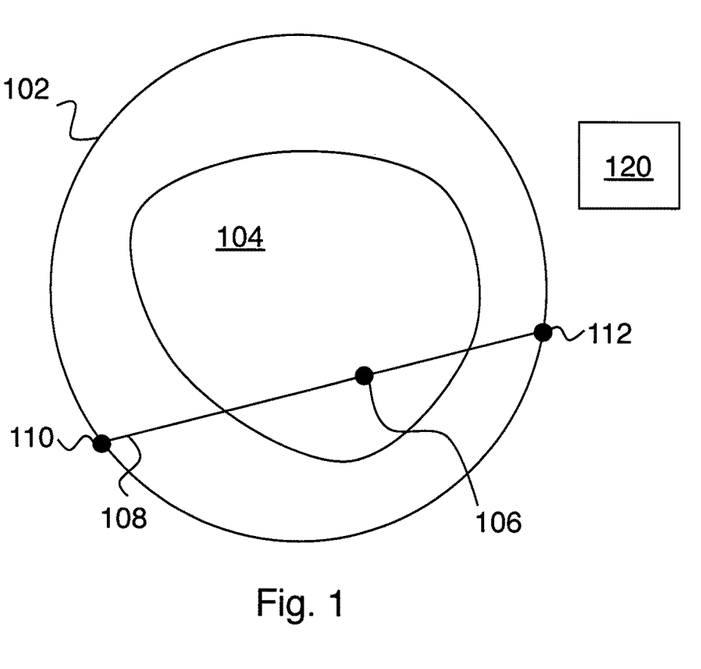
FIG. 1 shows an example geometry for emission tomography.

FIG. 1 shows an example of this kind of interaction geometry. Here object 104 is the patient, and it is assumed that a coincidence event is detected by detectors 110 and 112 of the system. Numerous other detectors (not shown) would be present at the periphery of chamber 102 in a real system. From this observation, the annihilation event is known to have occurred somewhere on the line of response 108, e.g., at point 106. Each registered coincidence event will have its corresponding line of response, and in general there will be no organization or pattern in the obtained lines of response. Positron absorption and emission are random events, and the line of response orientation from each electron-positron annihilation event is also random. A processor 120 is employed to reconstruct an image of object 104 from the measured data.

Although coincidence events provide line-integral measurements of the tracer distribution, histogramming these events into a sinogram is often inefficient because the number of events recorded is much smaller than the number of possible measurements, and, therefore, the sinogram is sparsely filled. Instead, reconstruction is performed directly from the list-mode data, using algorithms such as list-mode ordered-subsets expectation-maximization (OSEM), a variation of the popular OSEM algorithm, itself an accelerated version of the EM algorithm. List-mode OSEM computes the maximum likelihood estimate by iteratively applying a sequence of forward and back-projection operations along a list of lines. The forward and back-projection operations are performed along individual lines, taken from a list representing recorded coincidence events. The image is typically initialized with ones.

List-mode OSEM is a computationally-demanding algorithm that cannot be implemented using GPU texture-mapping approaches because the linear mapping between image space and projection space does not apply to a list of randomly-oriented lines. Instead, lines must be processed individually, which raises new, complex challenges for a GPU implementation.

A previous implementation of list-mode OSEM using a GPU is described in US patent publication 2007/0201611 and in an article by Pratx et al. "Fast, accurate and shift-varying line projections for iterative reconstruction using the GPU" (IEEE Trans. Med. Image 28(3) (2009) p435), both of which are incorporated by reference in their entirety. In the cited work, the data write operations were performed by programming in the vertex shaders where the output is written. A rectangular polygon is drawn into the frame-buffer object so that it encompasses the intersection of the line with the slice.

However, it remains desirable to provide further improvements for list mode OSEM reconstruction implementations using GPUs.

SUMMARY

A tomographic imaging system will provide its output in the form of measurement data along a set of line segments passing through the object to be imaged. Common X, Y and Z axes can be defined for the set of line segments and for the image volume of the object. The line segments are partitioned into an X-subset, a Y-subset and a Z-subset, where the X-subset lines are substantially not orthogonal to the X axis, the Y-subset lines are substantially not orthogonal to the Y axis, and the Z-subset lines are substantially not orthogonal to the Z axis.

Backprojections of line segment data to image data, and forward projections of image data to line segment data are performed on a slice-by-slice basis, where slices perpendicular to the X axis are used for the X-subset, slices perpendicular to the Y axis are used for the Y-subset, and slices perpendicular to the Z axis are used for the Z-subset. After a fixed number of iterations of forward and back-projection, or if a convergence criterion is met, the image data is provided as an output.

An important aspect of the present approach is to ensure that slice-line intersections never encounter the case where a line is parallel (or nearly parallel) to a slice. Such parallel or nearly parallel line-slice geometry is highly undesirable because the computation time for such a line-slice intersection can be much larger than for more orthogonal line-slice intersections. Such variability in computation time is a significant obstacle to efficient parallelization of the computations.

Further improvement in reconstruction efficiency can be obtained by providing further classification of the line segments. For example, a TOF emission tomography system provides TOF location values for the line segments. Such a system could provide an approximate position for event 106 on line of response 108 in the example of FIG. 1. Line segments can be classified by TOF location value in addition to orientation. More specifically, line segments in the X-subset can be sorted by the X coordinate of the TOF location, line segments in the Y-subset can be sorted by the Y coordinate of the TOF location, and line segments in the Z-subset can be sorted by the Z coordinate of the TOF location. Such classification can improve performance by avoiding unnecessary computation. For example, line segments having a TOF location value that is outside the current shared slice being processed can be disregarded in the calculations.

The present approach is amenable to parallelization to one or more GPUs on one or more host computers. More specifically, the per line computations of forward projections can be computed in parallel, and the per line computations for back projections can also be computed in parallel. If multiple GPUs are employed, they can be located in the same computer or be included in a cluster of two or more interconnected computers.

Although the present approach can be employed for any kind of tomographic data (i.e., both list mode data and sinogram data), it is especially useful for list mode data having no organization of line segments into sinograms.

Preferably, each slice can be partially or completely loaded into a shared memory accessible by multiple processing threads to provide a shared slice. All computations relating to a projection between the shared slice and associated line segments are preferably completed prior to loading a new slice to the shared memory. This can greatly increase computation efficiency by avoiding the duplication of memory access that would be required if non-shared memory is employed. Atomic update of voxels in the shared slice should be employed during backprojection, in order to avoid race conditions for the data written to the shared slice.

Processing threads can be assigned to the line segments such that longer line segments have equal or more processing threads than shorter line segments. In this manner, the processing time for various length line segments can be made more nearly equal, which expedites parallel processing.

Iteration loops with fixed lower and upper bounds independent of line segment orientation can be employed to reach all relevant voxels for the intersection of one of the line segments with one of the slices. These loop bounds apply to all slices and line segments. This is made possible by the prevention of parallel (and nearly parallel) line-slice intersections.

The present approach is also conducive to efficient memory access. The X-subset can be processed sequentially, the Y-subset can be processed sequentially, and the Z-subset can be processed sequentially. In other words, there is no need to access a Y-subset line segment while processing the X subset, etc., and it is preferred to avoid such out of order accesses. To further expedite matters, global memory can be organized such that the X-subset is contiguous in memory, the Y-subset is contiguous in memory, and the Z-subset is contiguous in memory. This way, sequential accesses of a subset lead to sequential memory accesses to a contiguous area of global memory, which can be more efficient than scattered accesses to global memory.

The present approach is applicable to any kind of tomographic imaging system, including but not limited to: positron emission tomography (PET) systems, single-photon emission computed tomography (SPECT) systems, x-ray computed tomography (CT) systems, ultrasound systems, TOF ultrasound systems, and TOF PET systems.

Embodiments of the invention include the methods described herein, and also include any processor configured to perform a method described herein. Such processors can be implemented in any combination of hardware and software.

DETAILED DESCRIPTION

To better appreciate the present work, it is helpful to first consider the challenges of implementing list-mode reconstruction on a GPU.
Section 1. Challenges One of the major obstacles is that list-mode reconstruction requires scatter operations. In principle, forward and backprojection operations can be performed either in a voxel-driven or line-driven manner. In GPGPU (General Purpose computing on GPUs) language, output-driven projection operations are gather operations, while input-driven projection operations are scatter operations. A gather operation reads an array of data from an array of addresses, while a scatter operation writes an array of data to an array of addresses. For instance, a line-driven forward projection loops through all the lines, and, for each line, reads and sums the voxels that contribute to the line. A voxel-driven forward projection loops through all the voxels in the image, and, for each voxel, updates the lines which receive contributions from the voxel. Both operations produce the same output, but data race conditions can occur in scatter operations. It has been previously suggested that, for best computing performance, the computation of line projection operations for tomography should be output-driven (i.e. gather as opposed to scatter).

In list-mode, the projection lines are not ordered, therefore, only line-driven operations may be utilized. As a result, list-mode back-projection requires scatter operations. The previous version of our list-mode reconstruction code, as described in U.S. 2007/0201611 and Pratx et al. (cited above), was implemented using OpenGL/Cg, and the scatter operations were performed by programming in the vertex shaders where the output is written. In that approach, a rectangular polygon is drawn into the frame-buffer object so that it encompasses the intersection of the line with the slice. This work presents a new approach where the output of the backprojection is written directly to the slice, stored in shared memory.

Another challenge arising when performing list-mode projections on the GPU is the heterogeneous nature of the computations. As we have seen, lines stored in a list must be processed individually. However, because of the variable line length, the amount of computation per line can vary greatly. Therefore, to achieve efficient load balancing, computation can be broken down into elements smaller than the line itself.

Lastly, PET image reconstruction differs from X-ray CT because, in order to reach high image quality, back- and forward projection must model the imperfect response of the system, in particular, physical blurring processes—such as, for instance, positron range and limited detector resolution. These blurring processes are implemented by projecting each line using a volumetric "tube" (e.g., tube 404 around line 402 on FIG. 4) and the use of wide, spatially-varying projection kernels. As a result, the number of voxels that participate in the projection of each line increases sharply, resulting in higher computational burden and increased complexity.

Section 2. Core Methods

To address the challenges described in the previous section, we present several novel approaches which have been implemented with CUDA (Compute Unified Device Architecture), which is a parallel programming framework provided by Nvidia. However, practice of the invention does not depend critically on the details of the programming framework employed. Suitable other programming frameworks include but are not limited to Cilk and OpenCL.

1) Lines are first presorted into three classes, according to their predominant direction to provide an X-subset, a Y-subset and a Z-subset. It is helpful to define the endpoints of each line segment as $(x1_j, y1_j, z1_j)$ and $(x2_j, y2_j, z2_j)$, where the line segments are indexed by j. Let $\Delta x_j=|x1_j-x2_j|$, $\Delta y_j=|y1_j-y2_j|$, and $\Delta z_j=|z1_j-z2_j|$. Preferably, X subset line segments have $\Delta x_j \geq \Delta y_j$ and $\Delta x_j \geq \Delta z_j$, Y subset line segments have $\Delta y_j \geq \Delta x_j$ and $\Delta y_j \geq \Delta z_j$, and Z subset line segments have $\Delta z_j \geq \Delta x_j$ and $\Delta z_j \geq \Delta y_j$. With this approach, the X-subset line segments vary more in X than in Y or Z, and similarly for the other subsets. It is convenient to refer to this approach as canonical sorting. This condition can be formulated in other mathematically equivalent ways (e.g., in terms of inner products with the axes or angles with respect to the axes).

As will be seen below, the main point of this requirement is to avoid having a slice and a line segment be too close to parallel, in a setting where the X-subset is processed in connection with slices perpendicular to the X-axis, the Y-subset is processed in connection with slices perpendicular to the Y-axis, and the Z-subset is processed in connection with slices perpendicular to the Z-axis. Accordingly, it is permissible to relax the above-given inequalities to the following: X subset line segments have $A\Delta x_j \geq \Delta y_j$ and $A\Delta x_j \geq \Delta z_j$; Y subset line segments have $A\Delta y_j \geq \Delta x_j$ and $A\Delta y_j \geq \Delta z_j$; and Z subset line segments have $A\Delta z_j \geq \Delta x_j$ and $A\Delta z_j \geq \Delta y_j$, for $1 \leq A \leq 2$. Thus, the X-subset lines are substantially not orthogonal to the x axis, the Y-subset lines are substantially not orthogonal to the y axis, and the Z-subset lines are substantially not orthogonal to the z axis. Although these more general approaches do not inherently specify a unique assignment of lines segments to the X-, Y- and Z-subsets, this non-uniqueness is not important, and can be removed by adopting any convenient convention for providing uniqueness.

Figure 3A:
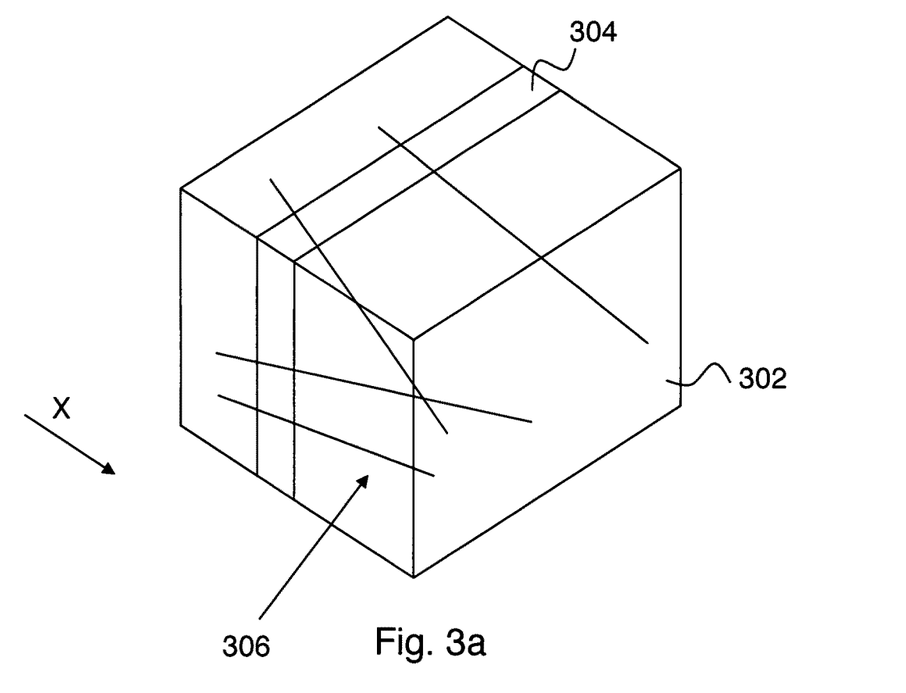
FIGS. 3*a-b* show an example of line segment classification according to an embodiment of the invention.

2) The image volume, which needs to be accessed randomly, is too large (>1 MB) to be stored in shared memory. Therefore, line projection operations traverse the volume slice-by-slice, with slice orientation perpendicular to the predominant direction of the lines. FIG. 3a shows this geometry for the case of the X-subset. Here image volume 302 is divided into multiple slices perpendicular to the X-axis. One of these slices is referenced as 304. Lines in the X-subset (several of which are referenced as 306) are processed in connection with the X-slices. The three classes of lines are processed sequentially. The image volume and the line geometry are stored in global memory. Streaming multiprocessors (SM) load one slice at a time into shared memory, which effectively acts as a local cache. This arrangement is schematically shown on FIG. 3b. Here slice 304 is in shared memory, and operations pertaining to line segments in the X-subset passing through the slice relate to localized regions of the slice, several of which are referenced as 308. One thread can be assigned to each line to calculate the portion of the projection involved with the current slice, which involves a 2-D loop with constant bounds (see point #4 below). The calculations relative to the shared slice are preferably performed in parallel by many concurrent threads, each thread processing one line.

3) Because lines have different lengths, more threads can be assigned to longer lines. By distributing the workload both over slices and over lines, the computation load is balanced.

Figure 4:
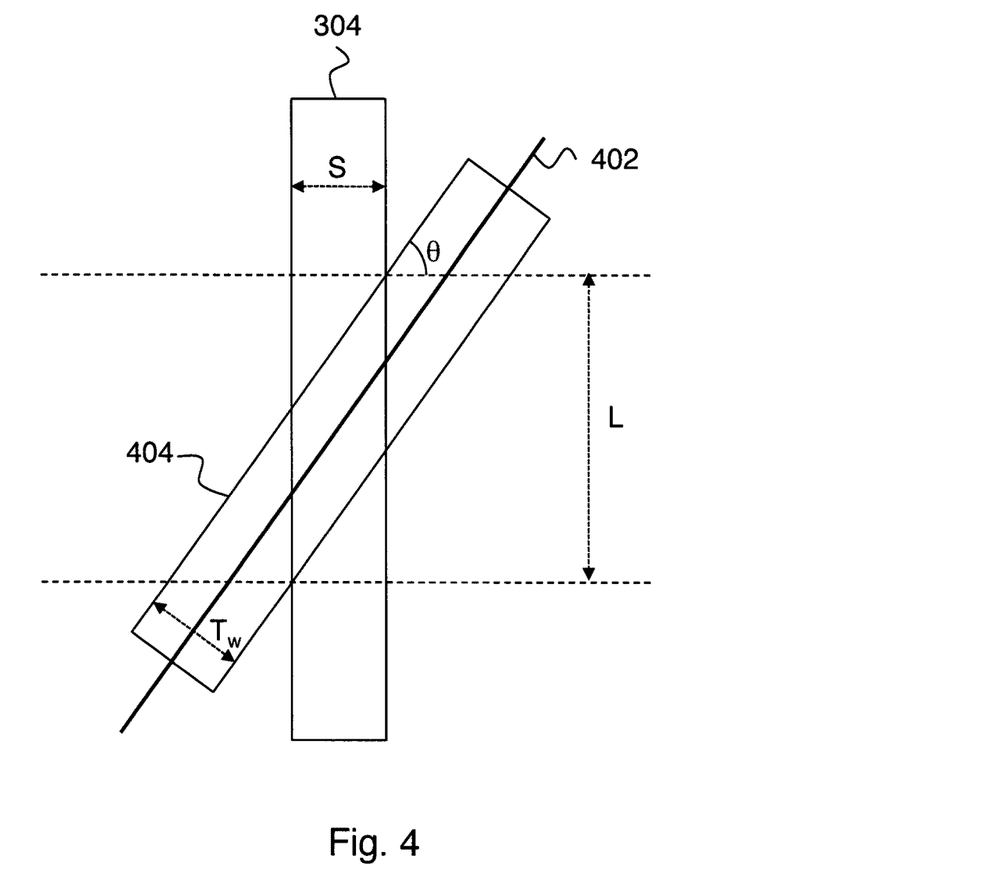
FIG. 4 shows a detailed view of line-slice intersection geometry.

4) All threads execute a double for-loop over all the voxels participating in the projection. Because lines are predominantly orthogonal to the slice, a for-loop with fixed bounds can reach all the voxels that participate in the projection while keeping the threads from diverging. FIG. 4 shows line-slice intersection geometry. Here line 402 intersects with a slice 304, and a tube 404 around line 402 accounts for the finite width of the projection kernel. As a result of the above-described sorting of line segments into the X-subset, Y-subset, and Z-subset, the angle θ shown on FIG. 4 has an upper bound that is substantially less than 90°. Details of this upper bound depend on details of the classification condition for the line segments. For example, canonical sorting leads to an angular upper bound of about 45° for θ. FIG. 4 is a projection view (e.g., it is in the X-Y or X-Z plane for an X-slice). Therefore, on FIG. 4, θ is the planar angle, and not the 3-D angle. It is the angle between the line and the slice, projected to the XY, XZ or YZ plane.

From the geometry of FIG. 4, the lateral distance L is given by $L=S*\tan(\theta)+Tw/\cos(\theta)$, where S is the slice width and Tw is the tube width. The trigonometric quantities $\cos(\theta)$ and $\tan(\theta)$ can be expressed as a function of $\Delta x$, $\Delta y$ and $\Delta z$ introduced above in 1). Using the geometry of FIG. 4, $\cos(\theta)=\Delta x/\text{sqrt}(\Delta x^2+\Delta y^2)$ and $\tan(\theta)=\Delta y/\Delta x$. Given the inequality relationships between Δx and Δy, we have L≤A*S+ sqrt(1+A²)*Tw. This upper bound can be used within line projections to identify which voxels within a slice participate in the projection. For the special case where A=1, the following upper bound can be used: L≤S+sqrt(2)*Tw. This upper bound relationship, independent of Δx, Δy and Δz, is valid for every possible pairing of the axis coordinates, provided that the inequality conditions described in 1) are satisfied.

While performing a forward (back-) projection, within the for-loop, the threads read (write to) all the voxels that participate for the current slice, weighting them by a kernel value computed on-the-fly on the GPU. The double for-loop can sometimes reach voxels that are outside the projection tube; these voxels can be rejected based on their distance to the line.

5) Because lines can intersect, atomic add operations must be used to update voxels during backprojection to avoid write data races between threads. On the NVIDIA Fermi architecture, these atomic operations can be performed with floating-point precision.

6) The list of lines is stored in global memory. Data transfers are optimized because the line geometry is accessed in a sequential and therefore coalesced manner.

Section 3. Implementation and Evaluation

1. Overview

As discussed previously, projecting a list of randomly-ordered lines on the GPU raises many challenges. To our knowledge, the only implementation of list-mode reconstruction on the GPU was done by our group using OpenGL/CG (US 2007/0201611 and Pratx et al., cited above).

However, using OpenGL for GPGPU has several drawbacks: The code is difficult to develop and maintain because the algorithm must be implemented as a graphics rendering process, performance may be compromised by OpenGL's lack of access to all the capabilities of the GPU, for example shared memory, and code portability is limited because the code uses hardware-specific OpenGL extensions. CUDA overcomes these challenges by making the massively-parallel architecture of the GPU more accessible to the developer in a C-like programming paradigm.

Briefly, the CUDA execution model organizes individual threads into thread blocks. The members of a thread block can communicate through fast shared memory, whereas threads in different blocks run independently. Atomic operations and thread synchronization functions are further provided to coordinate the execution of the threads within a block. Because the run-time environment is responsible for scheduling the blocks on the streaming multiprocessors (SMs), CUDA code is scalable and will automatically exploit the increased number of SMs on future graphics cards.

The methods described in this work were developed as part of our GPU line projection library (GLPL). The GLPL is a general-purpose, flexible library that performs line projection calculations using CUDA. It has two main features: (1) Unlike previous GPU projection implementations, it does not require lines to be organized in a sinogram; (2) A large set of voxels can participate in the projection; these voxels are located within a tube, a certain distance away from the line, and can be weighted by a programmable projection kernel. We have investigated using the GLPL with the Gemini TF, a PET system with TOF capabilities that require list-mode processing. The GLPL is flexible and can be used for image reconstruction for other imaging modalities, such as X-ray CT and single photon emission computed tomography (SPECT).

The GLPL implements GPU data structures for storing lines and image volumes, and primitives for performing line projection operations. Using the GLPL, the list-mode OSEM reconstruction algorithm can be run entirely on the GPU. The implementation was tested on a NVIDIA GeForce 285 GTX with compute capability 1.3.

2. Data Structures

Figure 3B:
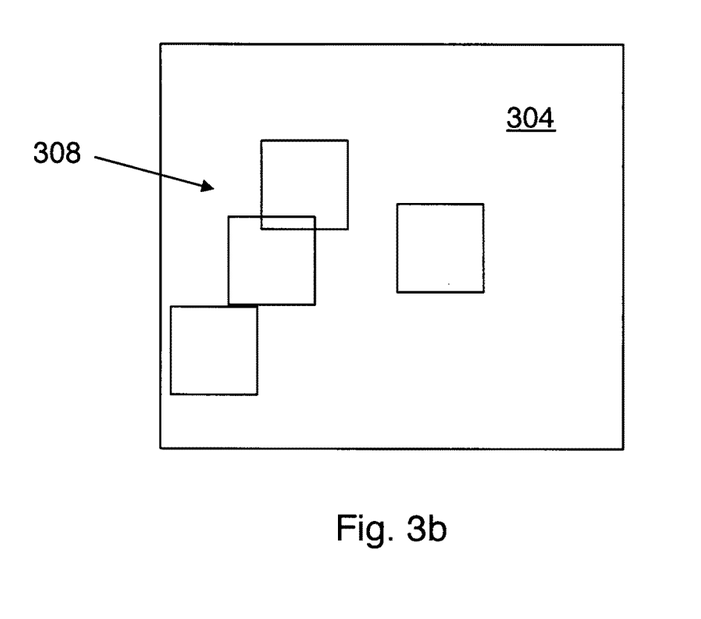

Image volumes are stored in global memory as 32-bit float 3D arrays. For typical volume sizes, the image does not fit in the fast shared memory. For instance, the current reconstruction code for the Gemini TF uses matrices with 72×72×20 coefficients for storing the images, thus occupying 405 kB in global memory. However, individual slices can be stored in shared memory, which acts as a managed cache for the global memory (FIGS. 3a-b).

By slicing the image volume in the dimension most orthogonal to the line orientation, the number of voxels comprised in the intersection of the projection tube with the current slice is kept bounded (FIG. 4). Therefore, the lines are divided into three subsets, according to their predominant orientation which can be determined by comparing Δx, Δy and Δz. Thus, this implementation made use of canonical sorting as described above. Each of the three classes is processed sequentially by different CUDA kernels. Because PET detectors are typically arranged in a cylindrical geometry, with axial height short compared to diameter, the z class is empty and only slices parallel to the x-z or y-z planes are formed. For the image volume specifications used in this work, these slices are 5.6 kB and easily fit in the 16 kB of shared memory.

The list of lines is stored in the GPU global memory, where each line is represented as a pair of indices using two 16 bit unsigned integers. A conversion function maps the indices to physical detector coordinates. The Philips Gemini TF PET system has, for instance, 28,336 individual detectors, organized in 28 modules, each module consisting of a 23×44 array of 4×4×22 mm³ crystals. A 5 min PET dataset can contain hundreds of millions of lines, and occupy hundreds of megabytes in global memory.

Lines are processed sequentially and, therefore, the geometry data are coherently accessed by the threads. To perform a projection, each thread first reads the two detector indices that define the line endpoints from the global memory. The memory access is coalesced, hence, on a device of compute capability 1.3, two 128-bit memory transactions are sufficient for a half-warp (i.e. eight threads running concurrently on the same SM). The indices are then converted into geometrical coordinates by arithmetic calculations.

3. Forward Projection

The line forward projection, mathematically a sparse matrix-vector multiplication, is a gather operation. The voxel values contained in a tube centered on the line are read, weighed by a projection kernel, and accumulated. A basic CPU implementation would employ three levels of nested loops with variable bounds.

However, such an approach is not efficient in CUDA because the computational load would be unevenly distributed. Instead, the outer level of the nested loops is performed in parallel by assigning one thread per line and per slice. Because the lines have been partitioned according to their orientation (FIG. 4), all the voxels in the tube (of width Tw) can be reached when the lateral range for each of the two inner for-loops is set to sqrt(2)*Tw+S. Hence, the computation load is homogeneously distributed onto the many cores. Having all the threads run the same number of iterations is an important feature of our implementation. If threads ran a variable number of iterations, their execution would diverge. Furthermore, having constant bounds allows the 2-D for-loop to be unrolled, providing additional acceleration.

In one implementation, forward projections can be computed as follows. First, the threads collaboratively load the image slice into the shared memory. After each thread reads out the coordinates of the line, the 2-D for-loop is performed. Within the loop, voxel values are read from the shared memory. These values are weighted by a projection kernel, computed locally, and accumulated within a local register. In our implementation, we used a Gaussian function, parameterized by the distance between the voxel center and the line, as a projection kernel. The Gaussian kernel is computed using fast GPU-intrinsic functions. The final cumulative value is accumulated in global memory.

4. Backprojection

Backprojection, mathematically the transpose operation of forward projection, smears the lines uniformly across the volume image. Backprojection is therefore, in computation terms, a scatter operation. Such scatter operations can be implemented explicitly in the CUDA programming model since write operations can be performed at arbitrary locations.

The CUDA implementation of line backprojection is modeled after the forward projection. There are, however, two basic differences. First, the current slice is cleared beforehand and written back to the global memory thereafter. Secondly, the threads update voxels in the slice instead of reading voxel data. Because multiple threads might attempt to update simultaneously the same voxel, atomic add operations are used.

Section 4: Evaluation and validation of results, total benefits, and limitations 1. Processing Time The GLPL was benchmarked for speed and accuracy against a CPU-based reference implementation. The processing time was measured for the back- and forward-projection of one million spatially-random lines, using an image volume of size 72×72×20 voxels and included the transfer of line and image data from the CPU to the GPU. The CPU implementation was based on the raytracing function currently employed in the Gemini TF reconstruction software. The hardware used in this comparison was a GeForce 285GTX for the GPU and an Intel Core2 E6600 for the CPU. The GPU and CPU implementations processed one million lines in 0.46 and 20 s, respectively.

Figure 5:
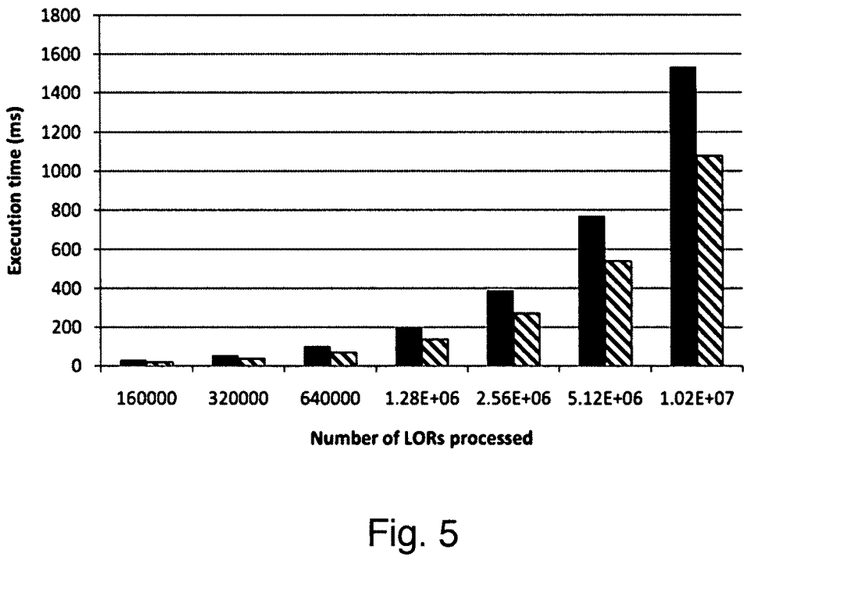
FIG. 5 shows how implementation of the present approach scales with increasing number of lines of response processed.

The proportional relationship between the number of random lines and the execution time is shown on FIG. 5 for two GPU hardware architectures (solid bar is GTX 285 (block size 512, grid size 30), diagonally striped bar is GTX 480 (block size 1024, grid size 15)). This result shows low overhead and good scaling of the implementation.

In the current implementation of the GLPL, most of the processing time is spent on GPU computation. Furthermore, data is only transferred once from the CPU to the GPU and used multiple times by the GPU, over multiple iterations. Likewise, some of the pre-processing tasks are only performed by the CPU once for the entire reconstruction.

Figure 6:
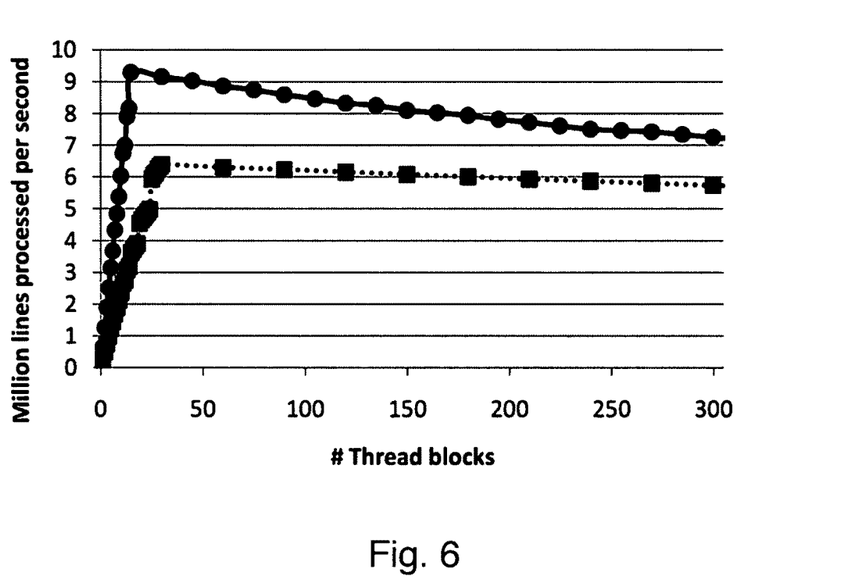
FIG. 6 shows processing rate as a function of the number of thread blocks.

The total throughput (expressed in number of lines processed per second) improves with increasing number of blocks, until reaching a plateau, as shown on FIG. 6. Here the dotted lines and squares relate to the GTX 285, which reaches its plateau at about 30 thread blocks, and the circles and solid line relate to the GTX 480 with block size 1024 and atomic writes, which reaches, its plateau at about 15 thread blocks. This result for the GTX 285 is expected because the GeForce 285 GTX can distribute thread blocks onto 30 SMs. When less than 30 blocks are scheduled, the overall compute performance is decreased because some of the SMs are idle. A similar analysis can be performed for the GTX 480 data. At the peak, the GLPL is able to process over 6 million lines per second on the GTX 285 and over 9 million lines per second on the GTX 480.

In order to gain more insight, we modeled the processing time $T_{proc}$ as the sum of three components:

$$T_{proc} = S/N + C + kN$$

where S is the scalable computation load, N the number of SM used, C the constant overhead (including CPU processing and CPU-GPU communication) and k the computation overhead per SM used. We found that for one million lines, the scalable computation load was S=5027 ms, the constant overhead C=87 ms, and the overhead per SM k=6 ms. The goodness of the fit was $r^2$=0.9998. Hence, 95% of all computation is scalable and runs in parallel.

2. Line Projection Accuracy

The accuracy of the GLPL was compared to a standard CPU implementation of line projection operations by running list-mode OSEM on both platforms. We measured the accuracy of the line projections on a dataset acquired with the GE eXplore Vista DR, a high-resolution PET scanner for small animal preclinical research.

A cylindrical "hot rod" phantom, comprising rods of different diameters (1.2, 1.6, 2.4, 3.2, 4.0, and 4.8 mm) was filled with 110 µCi of a radioactive solution of $Na^{18}F$ and 28.8 million lines were acquired. Volumetric images, of size 103× 103×36 voxels, were reconstructed using the list-mode 3-D OSEM algorithm. For simplicity, the usual data corrections (for photon scatter, random coincidences, photon attenuation, and detector efficiency normalization) were not applied. For this voxel space configuration, per 1 million LORs, each sub-iteration (forward projection, backprojection, and multiplicative update) took 746 ms, including 489 ms for calculation on the GPU, 210 ms for preprocessing on the CPU, and 46 ms for communication between the CPU and the GPU. The entire reconstruction took 1.3 minutes on the GPU and about 4.3 hours on the CPU. Note that for accuracy validation, the reference CPU reconstruction was performed with non-optimized research code because the fast raytracing functions used in the Gemini TF system (and used for measuring processing time) could not be easily ported to the eXplore Vista system.

Figure 7A:
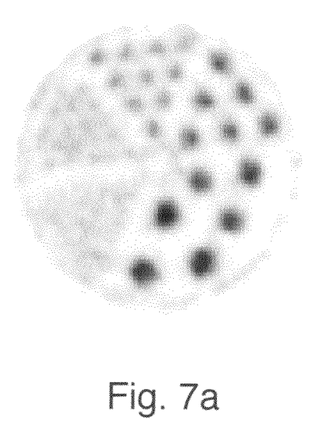
FIGS. 7*a-c* show reconstruction images of a phantom obtained with the present approach compared to a CPU reconstruction.
Figure 7B:
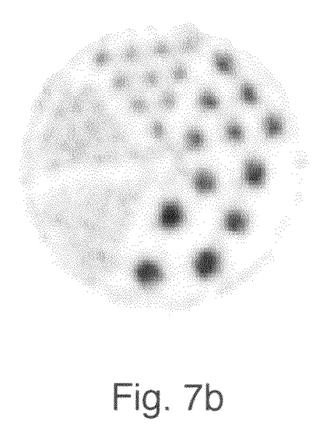
Figure 7C:
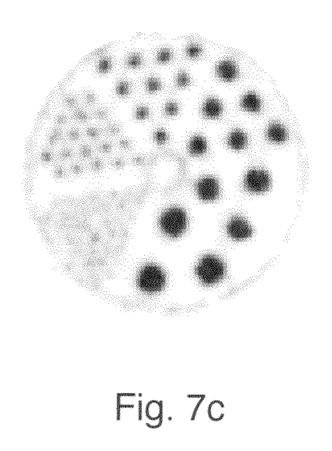

Transaxial image slices, reconstructed using the CPU (FIG. 7a) and the GPU (FIG. 7b), (2 iterations and 40 subsets of list-mode OSEM) are visually identical. The RMS deviation between both images is 0.08% after 5 iterations, which is negligible compared to the statistical variance of the voxel values in a typical PET scan (>10%, from Poisson statistics). A better image can be obtained if we use bigger subsets and more iterations (5 subsets and 20 iterations), but since the CPU code is very slow, the result is only available from the GPU code (FIG. 7c).

We believe that the small deviation we measured was caused by small variations in how the arithmetic operations are performed on the CPU and GPU. For example, we have observed that the exponential function produces slightly different results on each platform. These differences are amplified by the ill-posed nature of the inverse problem solved by the iterative image reconstruction algorithm.

Figure 8:
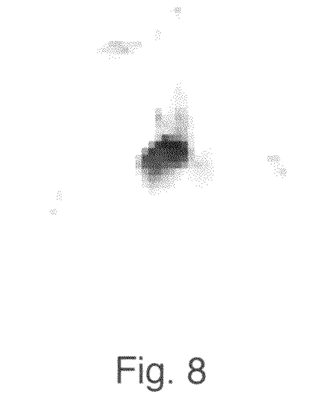
FIG. 8 shows a reconstruction image of a mouse PET scan obtained with the present approach.

As an example of a real application, a mouse was injected with $N^{18}F$, a PET tracer, and imaged on the eXplore Vista (FIG. 8). Image reconstruction (maximum intensity projection) was performed with 16 iterations and 5 subsets of list-mode OSEM using the GLPL.

The invention claimed is:

1. A method for tomographic reconstruction, the method comprising:
   obtaining measurement data from a tomographic imaging system along a set of line segments passing through an object;
   defining common X, Y, and Z axes for the set of line segments and for an image volume containing said line segments of the object;
   partitioning the set of line segments into an X-subset, a Y-subset and a Z-subset,
   wherein line segments in the X-subset are substantially not orthogonal to the X axis and are in a direction substantially more parallel to the X axis than the Y or Z axis,
   wherein line segments in the Y-subset are substantially not orthogonal to the Y axis and are in a direction substantially more parallel to the Y axis than the X or Z axis, and
   wherein line segments in the Z-subset are substantially not orthogonal to the Z axis and are in a direction substantially more parallel to the Z axis than the X or Y axis;
   forming slices perpendicular to the X axis by slicing the image volume in a dimension of the X, Y, and Z axes most orthogonal to the direction substantially more parallel to the X axis than the Y or Z axis;
   forming slices perpendicular to the Y axis by slicing the image volume in a dimension of the X, Y, and Z axes most orthogonal to the direction substantially more parallel to the Y axis than the X or Z axis;
   forming slices perpendicular to the Z axis by slicing the image volume in a dimension of the X, Y, and Z axes most orthogonal to the direction substantially more parallel to the Z axis than the X or Y axis;
   calculating backprojections of the X-subset, the Y-subset and the Z-subset to image data and forward projections of the image data to the X-subset, the Y-subset and the Z-subset on each slice,
   wherein slices perpendicular to the X axis are used for the X-subset,
   wherein slices perpendicular to the Y axis are used for the Y-subset, and
   wherein slices perpendicular to the Z axis are used for the Z-subset; and
   providing the backprojected and forward projected image data as an output.

2. The method of claim 1, wherein the forward projections and backprojections are performed on at least one graphics processing unit (GPU).

3. The method of claim 2, wherein the forward projections are computed in parallel by two or more GPUs, and wherein the backprojections are computed in parallel by the two or more GPUs.

4. The method of claim 3, wherein the two or more GPUs are part of a cluster of interconnected computers.

5. The method of claim 1, wherein the line segment data from the tomographic imaging system is provided as list mode data having no organization of line segments into sinograms.

6. The method of claim 1, further including:
   loading each slice at least partially into a shared memory;
   accessing the shared memory with multiple processing threads to provide a shared slice; and
   completing all computations relating to a projection between the shared slice and associated line segments prior to loading a new slice to the shared memory.

7. The method of claim 6, further including during the backprojection:
   updating voxels in the shared slice during backprojection.

8. The method of claim 6, further including:
   assigning the processing threads to the line segments such that longer line segments have as many or more processing threads as shorter line segments.

9. The method of claim 8, further including:
   employing iteration loops with fixed lower and upper bounds independent of line segment orientation to reach all relevant voxels for the intersection of one of the line segments with one of the slices.

10. The method of claim 1, wherein the tomographic imaging system comprises a system selected from the group consisting of: positron emission tomography (PET) system, single-photon emission computed tomography (SPECT) system, x-ray computed tomography (CT) system, ultrasound system, time of flight (TOF) PET system, and TOF ultrasound system.

11. A method of time of flight (TOF) tomographic reconstruction, the method comprising:
   obtaining data from a TOF tomographic imaging system including measuring line segment data along line segments passing through an object in a plurality in excess of three directions and TOF location values for each line segment;
   defining three, mutually orthogonal axes for an image volume of the object;
   classifying the line segments by TOF location value and by orientation, including:
   classifying by orientation including partitioning the line segments into three subsets, each subset corresponding to one of the three mutually orthogonal axes, each subset of the three subsets being assigned line segments which are substantially not orthogonal to the corresponding axis and are in a direction closer to parallel than orthogonal to the corresponding axis;
   sorting the line segments in each subset of the three subsets by the TOF location;
   iteratively calculating backprojections of the line segments of each subset of the three subsets to image data and forward projections of the image data to the line segment data on a slice by slice basis onto a slice perpendicular to the axis corresponding to the
   subset such that the line segments of the three subsets are projected to each of three mutually orthogonal slices; and
   outputting the image data as an output.

12. The method of claim 11, wherein TOF location values for line segments are used to expedite determination of whether or not one of the line segments intersects one of the slices.

13. One or more processors programmed to perform the method of claim 11.

14. A method for tomographic reconstruction, the method comprising:
   obtaining measurement data from a tomographic imaging system along a set of line segments passing through an object;
   defining common X, Y, and Z axes for the set of line segments and for an image volume of the object, each line segment being indexed by an integer j and having endpoints $(x1_j, y1_j, z1_j)$ and $(x2_j, y2_j, z2_j)$, wherein $\Delta x_j=|x1_j-x2_j|$, $\Delta y_j=|y1_j-y2_j|$, and $\Delta z_j=|z1_j-z2_j|$, and wherein A is a predetermined constant in the range $1 \leq A \leq 2$;
   partitioning the set of line segments into an X-subset, a Y-subset and a Z-subset, wherein line segments in the X-subset are substantially not orthogonal to the X axis, wherein line segments in the Y-subset are substantially not orthogonal to the Y axis, and wherein line segments in the Z-subset are substantially not orthogonal to the Z axis, and wherein:

X subset line segments have $A\Delta x_j \geq \Delta y_j$ and $A\Delta x_j \geq \Delta z_j$, Y subset line segments have $A\Delta y_j \geq \Delta x_j$ and $A\Delta y_j \geq \Delta z_j$, and Z subset line segments have $A\Delta z_j \geq \Delta x_j$ and $A\Delta z_j \geq \Delta y_j$;

calculating backprojections of the line segment data to image data and forward projections of the image data to the line segment data on a slice by slice basis, wherein slices perpendicular to the X axis are used for the X-subset, wherein slices perpendicular to the Y axis are used for the Y-subset, and wherein slices perpendicular to the Z axis are used for the Z-subset; and providing the image data as an output.

15. The method of claim 14, wherein the tomographic imaging system is a time of flight (TOF) emission tomography system that provides TOF location values for the line segments, and wherein the line segments are classified by TOF location value in addition to orientation.

16. The method of claim 14, wherein the X-subset is processed sequentially, wherein the Y-subset is processed sequentially, and wherein the Z-subset is processed sequentially.

17. The method of claim 16, wherein line segments are organized in global memory such that the X-subset is contiguous, the Y-subset is contiguous, and the Z-subset is contiguous.

18. The method of claim 14, wherein A=1.

19. A processor for tomographic reconstruction configured to perform the method of claim 14.

20. A tomographic reconstruction system comprising:

one or more computer memories;

a display device; and one or more processors connected with the memories and the display device and programmed to perform the method of claim 14 to provide the image data to the display device.

\* \* \* \* \*